(12) United States Patent
Khan et al.

(10) Patent No.: US 7,890,374 B1
(45) Date of Patent: Feb. 15, 2011

(54) SYSTEM AND METHOD FOR PRESENTING MUSIC TO CONSUMERS

(75) Inventors: Rehan M. Khan, San Bruno, CA (US); Marc Mathys, Snow Mass Village, CO (US); Christian Pirkner, San Francisco, CA (US); Thomas R. Sulzer, San Francisco, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 1559 days.

(21) Appl. No.: 09/695,526

(22) Filed: Oct. 24, 2000

(51) Int. Cl.
*G06Q 40/00* (2006.01)

(52) U.S. Cl. .............................. 705/26; 705/27; 707/3; 707/104

(58) Field of Classification Search .................... 705/1, 705/27, 10, 14, 26, 37
See application file for complete search history.

(56) References Cited

U.S. PATENT DOCUMENTS

| | | |
|---|---|---|
| 5,193,056 A | 3/1993 | Boes |
| 5,481,509 A | 1/1996 | Knowles ...................... 369/30 |
| 5,616,876 A | 4/1997 | Cluts |
| 5,726,909 A | 3/1998 | Krikorian ............... 364/514 R |
| 5,855,008 A * | 12/1998 | Goldhaber et al. ............ 705/14 |
| 5,862,260 A | 1/1999 | Rhoads |
| 5,918,223 A * | 6/1999 | Blum et al. ......................... 1/1 |
| 5,963,916 A * | 10/1999 | Kaplan ......................... 705/26 |
| 5,969,283 A | 10/1999 | Looney et al. |
| 5,969,539 A | 10/1999 | Veytsman et al. |
| 5,987,525 A | 11/1999 | Roberts et al. |
| 6,031,795 A | 2/2000 | Wehmeyer .................... 369/30 |
| 6,061,658 A | 5/2000 | Chou et al. ................... 705/10 |
| 6,061,680 A * | 5/2000 | Scherf et al. ........................ 1/1 |
| 6,118,450 A | 9/2000 | Proehl et al. ................ 345/349 |
| 6,134,547 A | 10/2000 | Huxley et al. .................. 707/5 |
| 6,154,773 A | 11/2000 | Roberts et al. |
| 6,161,132 A | 12/2000 | Roberts et al. |

(Continued)

FOREIGN PATENT DOCUMENTS

WO    WO01/20483 A2    3/2001

(Continued)

OTHER PUBLICATIONS

U.S. District Court, Northern District of California, "Order Addressing Parties' Cross Motions for Summary Judgment Re: Patent Infringement", Gracenote, Inc. v. MusicMatch, Inc., No. C 02-3162 CW, Aug. 26, 2004, 25 pages.

(Continued)

*Primary Examiner*—Hani Kazimi
(74) *Attorney, Agent, or Firm*—Fitzpatrick, Cella, Harper & Scinto

(57) ABSTRACT

The present invention provides a computer-implemented method and system for providing user requested music. The method comprises of receiving user input that defines a plurality of music search parameters. Some of the music search parameters may describe music content attributes. Thereafter, the process searches for music samples based upon the user provided search parameters. The process then presents music samples to the user.

The method also determines if the user wants to buy any of the presented music samples, a set of music samples similar to the music purchased and/or a set of music samples different than the music bought.

32 Claims, 11 Drawing Sheets

U.S. PATENT DOCUMENTS

| | | | |
|---|---|---|---|
| 6,177,626 B1 | 1/2001 | Ishibashi | |
| 6,182,126 B1 | 1/2001 | Nathan et al. | 709/219 |
| 6,192,340 B1 | 2/2001 | Abecassis | 704/270 |
| 6,230,192 B1 | 5/2001 | Roberts et al. | |
| 6,230,207 B1 | 5/2001 | Roberts et al. | |
| 6,233,682 B1 | 5/2001 | Fritsch | |
| 6,240,459 B1 | 5/2001 | Roberts et al. | |
| 6,243,725 B1 | 6/2001 | Hempleman et al. | 707/530 |
| 6,304,523 B1 | 10/2001 | Jones et al. | |
| 6,330,593 B1 | 12/2001 | Roberts et al. | |
| 6,397,189 B1 | 5/2002 | Martin et al. | 705/1 |
| 6,505,160 B1 | 1/2003 | Levy et al. | |
| 6,539,395 B1 | 3/2003 | Gjerdingen et al. | |
| 6,829,368 B2 | 12/2004 | Meyer et al. | |
| 6,953,886 B1 | 10/2005 | Looney et al. | |
| 7,205,471 B2 | 4/2007 | Looney et al. | |
| 7,324,953 B1 * | 1/2008 | Murphy | 705/10 |
| 2003/0028796 A1 | 2/2003 | Roberts et al. | |
| 2003/0046283 A1 | 3/2003 | Roberts | |
| 2003/0086341 A1 | 5/2003 | Wells et al. | |
| 2003/0135513 A1 | 7/2003 | Quinn et al. | |
| 2004/0074378 A1 | 4/2004 | Allamanche et al. | |
| 2004/0143349 A1 | 7/2004 | Roberts et al. | |
| 2004/0172411 A1 | 9/2004 | Herre et al. | |
| 2004/0267522 A1 | 12/2004 | Allamanche et al. | |
| 2005/0017879 A1 | 1/2005 | Linzmeier et al. | |
| 2005/0076027 A1 | 4/2005 | Kaiser et al. | |
| 2005/0097137 A1 | 5/2005 | Kaiser et al. | |
| 2005/0097138 A1 | 5/2005 | Kaiser et al. | |

FOREIGN PATENT DOCUMENTS

| | | | |
|---|---|---|---|
| WO | WO01/20483 | A3 | 3/2001 |
| WO | WO01/37465 | A2 | 5/2001 |
| WO | WO01/37465 | A3 | 5/2001 |
| WO | 02/29610 | A2 | 4/2002 |
| WO | WO02/065782 | A1 | 8/2002 |
| WO | WO02/077966 | A2 | 10/2002 |
| WO | WO02/077966 | A3 | 10/2002 |
| WO | WO02/093823 | A1 | 11/2002 |
| WO | WO03/067466 | A2 | 8/2003 |
| WO | WO03/067466 | A3 | 8/2003 |
| WO | WO03/096337 | A2 | 11/2003 |
| WO | WO03/096337 | A3 | 11/2003 |
| WO | WO2004/044820 | A1 | 5/2004 |
| WO | WO2004/077430 | A1 | 9/2004 |
| WO | WO2004/081817 | A1 | 9/2004 |

OTHER PUBLICATIONS

U.S. District Court, Northern District of California, "First Amended Complaint for 1. Breach of Contract, 2. Unfair Competition, 3. Trademark Infringement, 4. Intentional Interference With Prospective Economic Advantage, 5. Negligent Interference With Prospective Economic Advantage, 6. Patent Infringement, Demand for Jury Trial", *Gracenote, Inc.* v. *MusicMatch, Inc.*, No. C 02-3162 CW, Aug. 21, 2002, 33 pages.

U.S. District Court, Northern District of California, "Stipulation and [Proposed] Order RE Dismissal of Adaptec, Inc.", CDDB, Inc. dba *Gracenote* v. *Adaptec, Inc.*, and *Roxio, Inc.*, No. C-01 20428 JW, Dec. 31, 2001, 3 pages.

U.S. District Court, Northern District of California, "Stipulation and [Proposed] Order re Dismissal of Roxio, Inc. and Gracenote", CDDB, Inc. dba *Gracenote* v. *Adaptec, Inc.*, and *Roxio*, Inc., No. C-01 20428 JW, Dec. 31, 2001, 5 pages.

*Moaec, Inc.* v. *Musicip Corporation, et al.*, Civil Action No. 07 C 0654 S, Complaint filed Nov. 16, 2007.

* cited by examiner

Figure 4C1

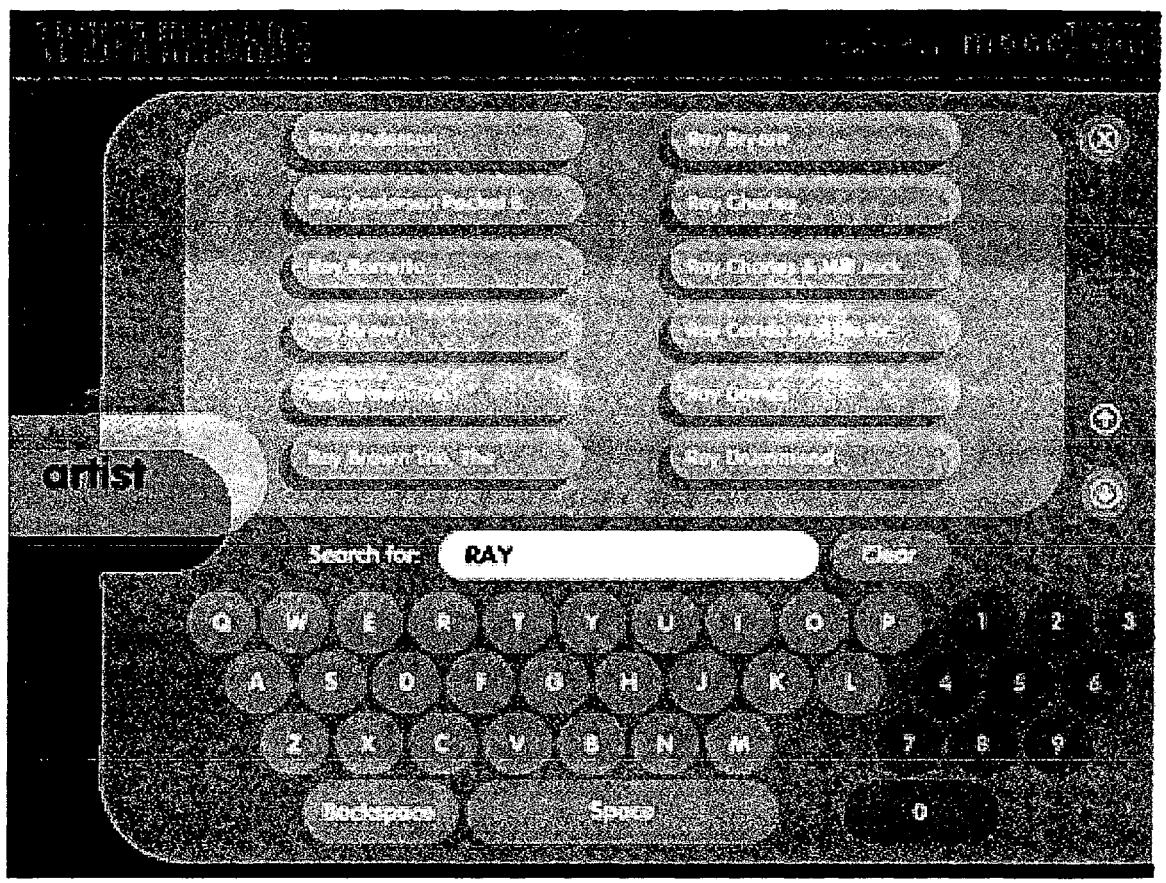
Figure 4C2

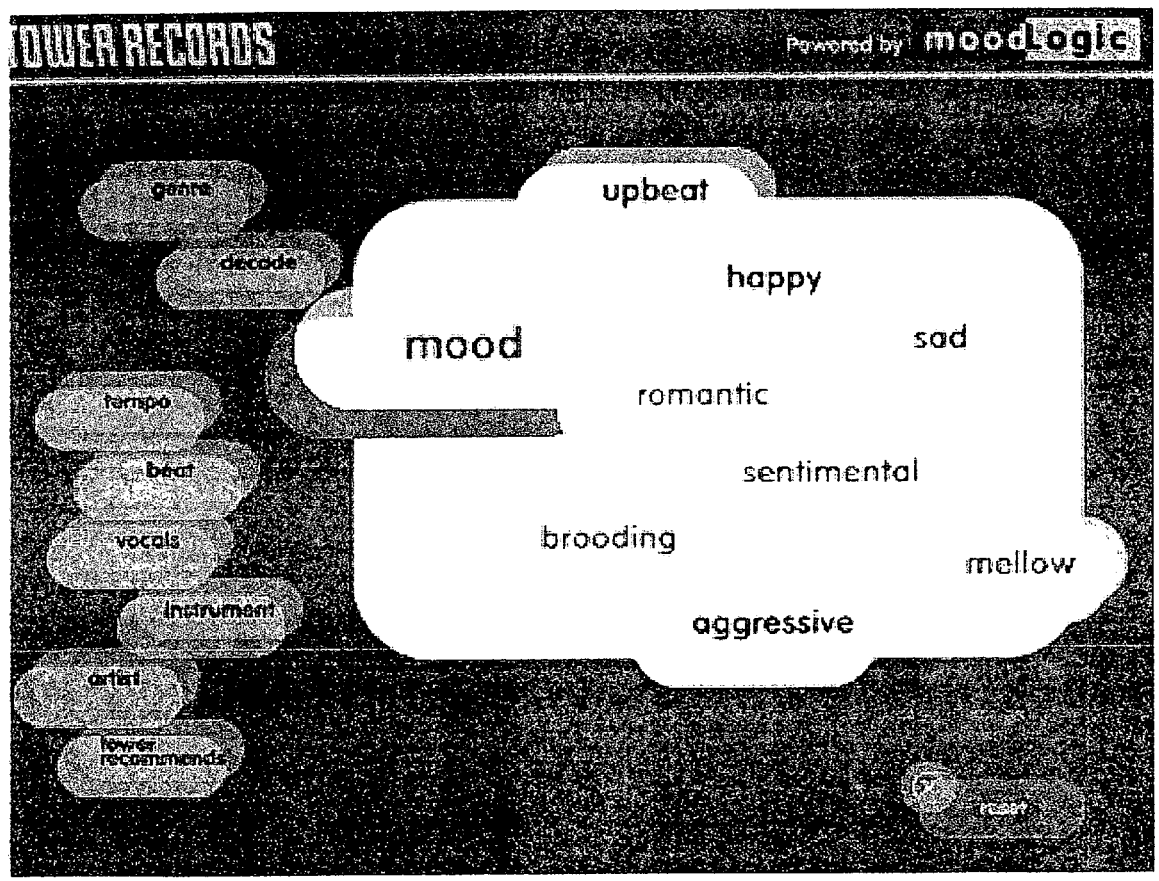
Figure 4C3

SYSTEM AND METHOD FOR PRESENTING MUSIC TO CONSUMERS

CROSS REFERENCE TO RELATED APPLICATIONS

The present Application is related to the U.S. patent application Ser. No. 09/533,045, entitled "METHOD FOR CREATING A DATABASE FOR COMPARING MUSIC ATTRIBUTES", filed on Mar. 22, 2000, assigned to the Assignee of the present invention, and is hereby incorporated by reference in its entirety.

FIELD OF THE INVENTION

The present invention relates to business methods for presenting music to consumers that allows content based music searching.

BACKGROUND

Conventional retail stores ("brick and mortar" stores) present music to consumers inefficiently. When a consumer goes to a retail store to purchase music, for example, "Blockbuster"™ (Registered Trademark), the consumer has a limited number of choices to search for music. One reason for the limited number of choices is that conventionally music is classified only in a restricted number of classes. For example, music may be stored at a retail store under the name of the artists, genre (Rock, Blues, Jazz etc.), label, and title of the album, etc. Conventional retailers do not have a mechanism that allows consumers to search for music based upon music content.

The advent and popularity of the Internet has created numerous opportunities for retailers to conduct business in the electronic arena ("E-commerce"). Today, E-commerce is a viable business option and music can easily be sold via the Internet.

The Internet connects thousands of computers world wide into a vast network using well-known protocols, for example, Transmission Control Protocol (TCP)/Internet Protocol (IP). Information on the Internet is stored world wide as computer files, mostly written in the Hypertext Mark Up Language ("HTML"). The collection of all such publicly available computer files is known as the World Wide Web (WWW).

The WWW is a multimedia-enabled hypertext system used for navigating the Internet and is made up of hundreds of thousands of web pages with audio, images, text and video files. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. A Web Browser may run on any computer connected to the Internet. Currently, various browsers are available of which two prominent browsers are Netscape Navigator and Microsoft Internet Explorer. The Web Browser receives and sends requests to a web server and acquires information from the WWW. A web server is a program that, upon receipt of a request, sends the requested data to the requesting user.

A standard naming convention known as Uniform Resource Locator ("URL") has been adopted to represent hypermedia links and links to network services. Most files or services can be represented with a URL. URLs enable Web Browsers to go directly to any file held on any WWW server.

Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

The advent and progress of the Internet has changed the way consumers buy or listen to music. Consumers today can download digital music via the Internet using MPEG 3 technology, with a click of a mouse. Audio delivery techniques have also made it easy to stream audio from a website to a consumer, upon demand. A typical music listener can download audio files from the WWW, store the audio files, and listen to music.

Although the progress in Web technology allows consumers to download music easily, a consumer buying music on line is still limited by the same constraints facing a consumer who buys music at a brick and mortar store i.e., limited number of search techniques for searching music and lack of content based music search techniques. Therefore, commercial retail music environment whether electronic or brick and mortar, suffer from the same drawbacks.

Hence what is needed is a business method that will efficiently present music to a consumer based upon the consumer's preferences and allow the consumer to search for music based upon music content.

SUMMARY

The present invention solves the foregoing drawbacks by providing a method and system for efficiently presenting music to consumers that allows content based music searching. In one aspect, the invention provides a computer-implemented method of providing user requested music. The method comprises of receiving user input that defines a plurality of music search parameters. Some of the music search parameters may describe music content attributes. Thereafter, the process searches for music samples based upon the user provided search parameters. The process then presents music samples to the user. The method also determines if the user wants to buy any of the presented music samples, a set of music samples similar to the music purchased and/or a set of music samples different than the music bought.

In yet another aspect, the present invention provides a computer system for providing user requested music. The system includes an input module for receiving user-defined parameters for searching music; and a search module for searching music based upon the user defined parameters.

One advantage of the present invention is that retail store, brick and mortar or on line, can provide a tool to consumers for efficiently searching for music based upon music content.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 4C1 is a flow diagram for acquiring user input.

FIG. 4C2 is a flow diagram for acquiring user input.

FIG. 4C3 is a flow diagram for acquiring user input.

The use of similar reference numerals in different figures indicates similar or identical items.

DESCRIPTION OF THE PREFERRED EMBODIMENTS

Figure 1:
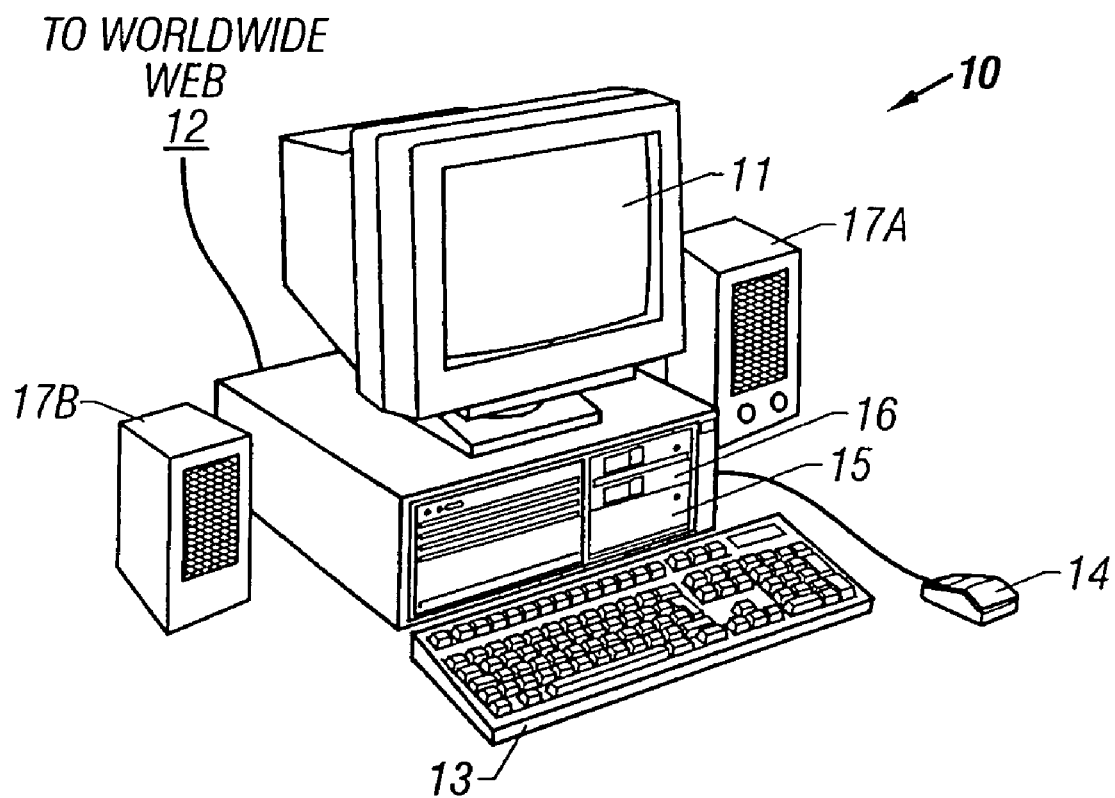
FIG. 1 illustrates a computing system to carry out the inventive technique.

FIG. 1 is a block diagram of a computing system for executing computer executable process steps, according to one aspect of the present invention. FIG. 1 includes a host computer 10 and a monitor 11. Monitor 11 may be a CRT type, a LCD type, or any other type of color or monochrome display device. Also provided with computer 10 is a keyboard 13 for entering text data and user commands, and a pointing device 14 for processing objects displayed on monitor 11.

Computer 10 includes a computer-readable memory medium such as a rotating disk 15 for storing readable data. Besides other programs, disk 15 can store application programs including web browsers by which computer 10 connects to the Internet, audio files and the systems according to the present invention, as described below.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like also provides computer 10 with an Internet connection 12 to the World Wide Web (WWW). The Internet connection 12 allows computer 10 to download data files, audio files, application program files and computer-executable process steps embodying the present invention. Computer 10 is also provided with external audio speakers 17A and 17B to assist a listener to listen to music either on line, downloaded from the Internet or off-line using a CD (not shown). It is noteworthy that a listener may use headphones instead of audio speakers 17A an 17B to listen to music.

Figure 2:
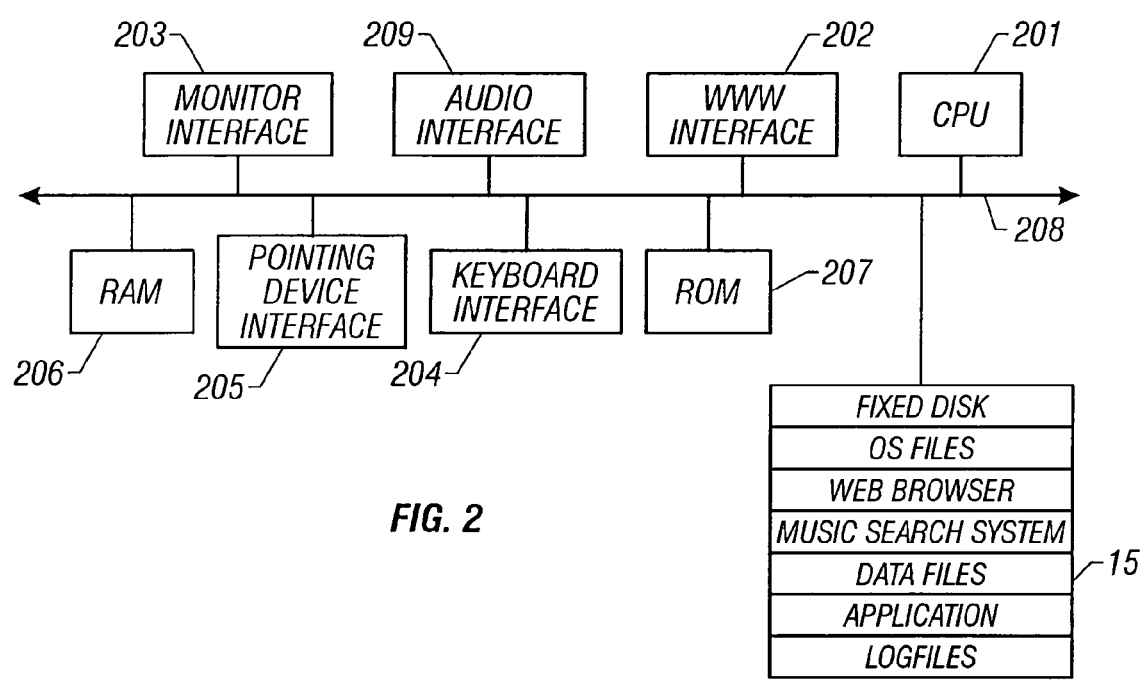
FIG. 2 is a block diagram of the architecture of the computing system of FIG. 1.

FIG. 2 is a block diagram showing the internal functional architecture of computer 10. Computer 10 includes a CPU 201 for executing computer-executable process steps and interfaces with a computer bus 208. Also shown in FIG. 2 are a WWW interface 202, a display device interface 203, a keyboard interface 204, a pointing device interface 205, an audio interface 209, and a rotating disk 15. Audio interface 209 allows a listener to listen to music, on line (downloaded using the Internet or a private network) or off-line (using a CD, not shown).

As described above, disk 15 stores operating system program files, application program files, web browsers, and other files. Some of these files are stored on disk 15 using an installation program. For example, CPU 201 executes computer-executable process steps of an installation program so that CPU 201 can properly execute application programs. A random access main memory ("RAM") 206 also interfaces to computer bus 208 to provide CPU 201 with access to memory storage. When executing stored computer-executable process steps from disk 15 (or other storage media such as floppy disk 16 or WWW connection 12), CPU 201 stores and executes the process steps out of RAM 206.

Read only memory ("ROM") 207 is provided to store invariant instruction sequences such as start-up instruction sequences or basic input/output operating system (BIOS) sequences for operation of keyboard 13.

The present invention is not limited to the computer architecture described above. Systems comparable to computer 10 for example, portable devices like the Palm Pilot, a registered trademark, that can be connected to the Internet may also be used to implement the present inventive techniques.

Figure 3:
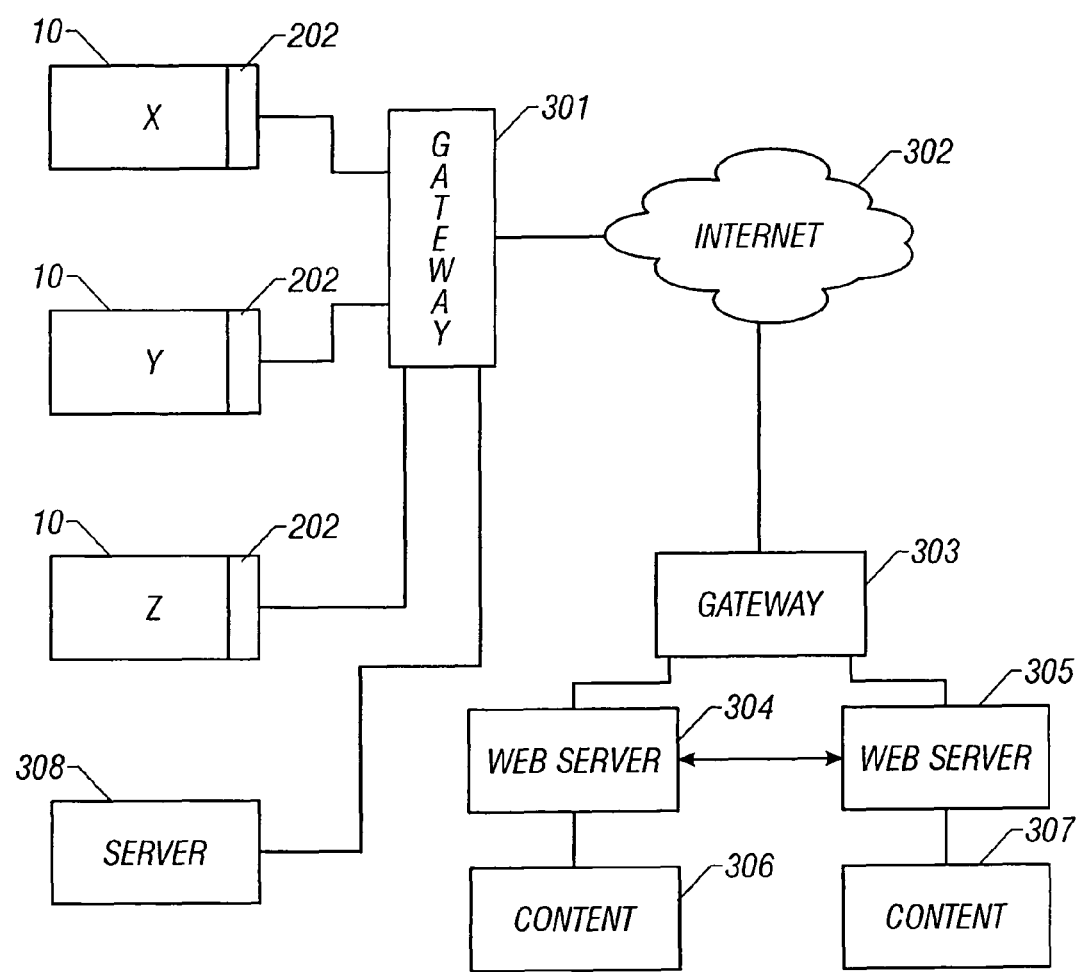
FIG. 3 is a block diagram of the Internet Topology.

FIG. 3 shows a typical topology of a computer network with computers similar to computer 10, connected to the Internet. For illustration purposes, three computers X, Y and Z are shown connected to the Internet 302 via Web interface 202, through gateway 301, where gateway 301 can interface numerous computers. Web interface 202 may be a modem, network interface card or a unit for providing connectivity to other computer systems over a network using protocols such as X.25, Ethernet or TCP/IP, or to any device that allows direct or indirect computer-to-computer communications.

It is noteworthy that the invention is not limited to a particular number of computers. Any number of computers that can be connected to the Internet 302 or to any other computer network may be used to implement the present inventive techniques.

FIG. 3 further also shows a second gateway 303 that connects a network of web servers 304 and 305 to the Internet 302. Web servers 304 and 305 may be connected with each other over a computer network. Web servers 304 and 305 can provide content including music samples and audio clips to a user from database 306 and/or 307. Web servers 304 and 305 can also host the system according to the present invention. Also shown in FIG. 3 is a client side web server 308 that can be provided by an Internet service provider.

Figure 4A:
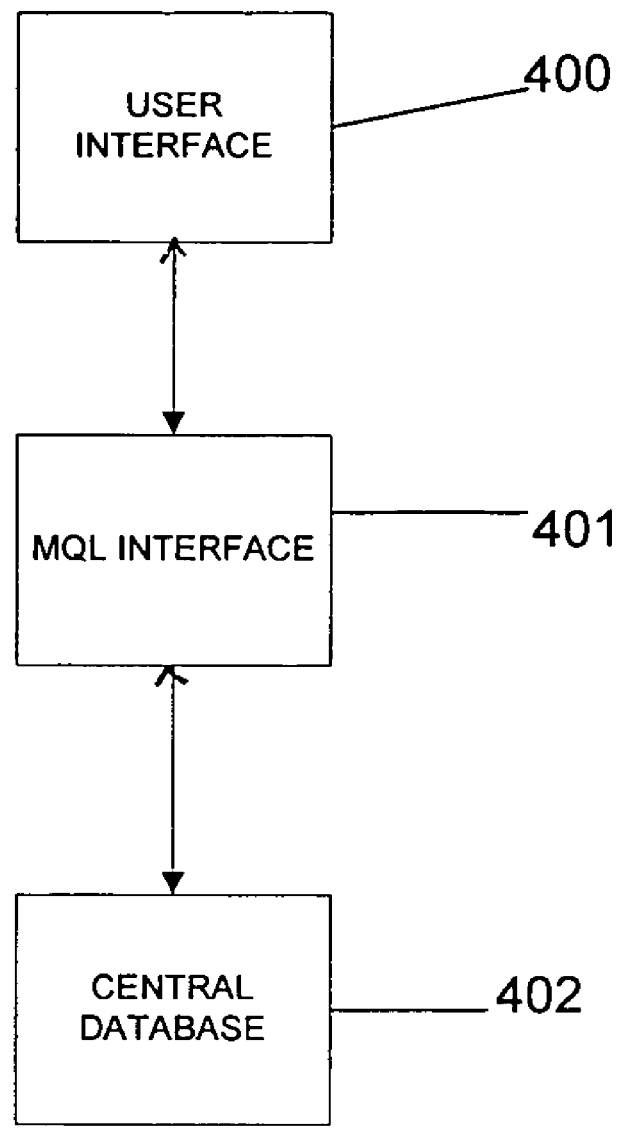
FIG. 4A is a block diagram of the architecture of the present system.

FIG. 4A is a block diagram of the system architecture that efficiently presents music samples to a consumer based upon consumer preferences. A User Interface (UI) 400 is an interactive graphical interface that allows a user to input search parameters that may describe music content attributes. UI 400 may be presented to a user on display device 11. One such UI 400 is described in U.S. patent application Ser. No. 09/533,045, entitled, "METHOD FOR CREATING A DATABASE FOR COMPARING MUSIC ATTRIBUTES", filed Mar. 22, 2000, assigned to the common assignee herein, and incorporated herein in its entirety. The present invention is not limited to the layout of UI 400 as described in the aforementioned U.S. Patent application. Various modifications could be made to UI 400.

A consumer can input a search request in UI 400 defining search parameters that may define music attributes. An example of one such search request may be "Search for Music, that is "Sad", is a crossover between "Blues and Jazz", "with a lead male vocalist, with the saxophone being the most prominent instrument and released in the last ten years". Based upon the above request "Sad, Blues/Jazz, male vocalist, saxophone and last ten years" become search parameters. As can be seen from the search parameters, "Sad", crossover between Blues/Jazz, male vocalist and saxophone describe music content. The search parameters define certain feature vectors that are used for searching music.

Various feature vectors and the process for determining feature vectors is described in U.S. patent application Ser. No. 09/533,045, entitled, "METHOD FOR CREATING A DATABASE FOR COMPARING MUSIC ATTRIBUTES", filed Mar. 22, 2000, assigned to the common assignee herein and incorporated herein in its entirety.

In one example embodiment, listeners are provided music samples either on-line via the Internet or on a CD-ROM, with a list of questions corresponding to the music samples. The questions are used to solicit listener responses that describe music attributes and assign values to feature vectors for the attributes. A listener using a computer may download music samples from a web server with a list of questions. A questionnaire that evaluates the cognitive, emotional, esthetical, and situational effects of music on actual listeners may also be provided.

Prior to providing music samples or questions, listener information may also be collected. Also, before a listener can start listening to sample music, a training session may be conducted to familiarize a listener with the music rating process.

An example of a list of questions may be are provided to a listener prior to, after or while a listener is listening to the music sample. A listener that listens to more than one song is also asked to compare songs. Examples of questions may be grouped as follows:

Cognitive: This song is similar to the previous song; I like this song; This tune sticks in my mind; This song is simple; This song tells a story; This song emphasizes the melody; This song emphasizes the vocals; This song is speech-like; This song has a strong beat; This song is fast; and This song has a good groove.

Emotion: This song is intense; This song is upbeat; This song sounds aggressive; This song is relaxing; This song is mellow; This song is sad; This song is romantic; and This song expresses a broken heart.

Esthetics: The singer has a smooth voice; The singer has a soulful voice; The singer has a powerful voice; The singer has a truly great voice; This song has a high voice; and This song has a sexy voice.

Social behavior: This song would be good for easy listening; This song would be good for a wild dance party; This song would be good for slow dancing; This song would be good for a workout; and This song would be good in a shopping mall.

Other questions ask the listener if the listener knows the music or has a recording of the sample. For example, a question which asks the listener if the listener can describe the situations where the music will be appropriate, and if the music sample reminds the listener of an artist(s) or song. Another example question may asks the listener to describe the song in other words.

Preferably, every question requires a response. Based upon listener response, a value is assigned to a feature vector that defines music attributes.

Expert data can be collected by providing music samples to experts accompanied by a plurality of questions. Music samples and questions to expert music listeners may be provided over the Internet, a private network and/or music CDs, etc. For example, a music expert using computer may download music samples from a web server with a list of questions.

Example questions that a music expert may be asked for collecting expert data are questions to identify music genre, for example, whether a music sample belongs to, an Alternative, a Blues, a country, an Electronic/Dance, a Folk, a Gospel, a Jazz, a Latin, a New Age, a R&B/Soul, a Rap/Hip-Hop, a Reggae and a Rock style of music. The expert is not limited to choosing a single genre, instead, the expert may choose plural genres to identify a particular music sample.

Questions establish the importance of a particular music style in a given sample, and also determine crossover between different genres. For example, if an expert that listens to a music sample and gives a high rating for Blues and Country in questions, then the music sample may have a cross-over between Blues and Country style.

Within the various genres mentioned above, there may also be sub styles, for example, Gospel, Motown, Stax/Memphis, Philly, Doo-wop, Funk, Disco, Old School, Blue-eyed soul, Adult contemporary, Quiet storm, Dance/techno, Electro/Synthetic, New Jack Swing, Retro/Alternative, Hip Hop, Rap and Gangsta, etc. Questions may also require an expert to rate music sub-styles to determine the sub-genre of a music sample.

One example question may ask an expert to identify whether a music sample is instrumental or vocal. If the music is primarily vocal, then the expert also identifies if the lead vocalist is a male or female. Another question may ask the expert to describe backup vocalist(s), if any. Still another question may ask an expert to describe a band, if any, associated with a music sample. The expert may also be asked to identify the three most important instruments that may exist in a music sample.

An expert may be given standard statements and asked to either agree or disagree with various levels of conviction. An expert may also acknowledge if the expert is aware of the music and/or has a recording of the music.

All expert responses to the foregoing questions assign specific values to the music feature vectors.

It is noteworthy that the questions described above are merely illustrative and do not limit the scope of the invention. The number and format of the questions as presented to music listeners or expert listeners may be different.

Explicit "pairwise" questions are provided to expert music listeners. Expert music listeners are provided with a pair of music samples and experts rate the similarity of the samples. Although music is provided in pairs for evaluation, the invention is not limited to providing music samples in pairs. Various other presentation techniques may be used, for example, music samples may be provided as a group of three, and so forth.

Examples of certain vectors to define music attributes are provided below:

(a) Emotional quality vector: This vector is based upon the emotional response derived from a listener by a particular piece of music, for example, whether music samples are: Intense, Happy, Sad, Mellow, Romantic, Broken-hearted, Aggressive, Upbeat, and the like.

(b) Vocal quality vector: A vocal quality vector is based on the vocal qualities of a particular piece of music, for example, whether a music sample has a: Sexy voice, Smooth voice, Powerful voice, Great voice, Soulful voice, and the like.

(c) Sound quality vector: A vector based on the vocal quality of a particular music sample, for example, whether a music sample has a: Strong beat, Is Simple, Has a good Groove, Is Fast, Is speech like, Emphasizes a melody, and the like.

(d) Situational vector: A vector that establishes the optimum situation in which a particular piece of music may be used, for example, whether a music sample is: Good for a workout, Good for a shopping mall, Good for a dinner party, Good for a dance party, Good for slow dancing, Good for studying, Good for driving, Good for relaxing, and the like.

(e) Genre vector: A vector that determines the genre or a genre combination of a particular piece of music, for example, whether a music sample belongs to the following genres or a combination of the following genres: Alternative, Blues, Country, Electronic/Dance, Folk, Gospel, Jazz, Latin, New Age, R&B/Soul, Rap/Hip-Hop, Reggae, Rock, and the like.

(f) Ensemble Vector: A vector based upon music's ensemble, for example, if a music sample includes: Female solo, Male solo, Female duet, Male duet, Mixed duet, Female group, Male group, Instrumental, and the like.

(g) Instrument vector: An instrument vector is based upon the level of importance of a particular instruments, for example, if a music sample includes an: Acoustic guitar, Electric guitar, Bass, Drums, Harmonica, Organ, Piano, Synthesizer, Horn, Saxophone, Strings and the like.

Although the entirety of the above mentioned application is incorporated by reference and forms part of this application the following information provides a summary of various music attributes described in greater detail in that application.

One process compares a plurality of music samples, wherein comparing feature vectors compares the music samples. Examples of some feature vectors defined by the process are as follows:

An emotional quality vector, wherein the emotional quality vector is based upon a music listener's response to questions regarding a music sample indicating if the music sample is Intense, Happy, Sad, Mellow, Romantic, Heartbreaking, Aggressive, or Upbeat, etc.;

A vocal quality vector, wherein the vocal vector is based upon a music listener's response to questions regarding a music sample indicating that the music sample includes a Sexy voice, a Smooth voice, a Powerful voice, a Great voice, or a Soulful voice, etc.;

A sound quality vector, wherein the sound quality vector is based upon a music listener's response to questions regarding a music sample indicating if the music sample has a Strong beat, is simple, has a good groove, is speech like, or emphasizes a melody, etc.;

A situational quality vector, wherein the situational quality vector is based on a music listener's response to questions regarding a music sample indicating if the music sample is good for a workout, a shopping mall, a dinner party, a dance party, slow dancing, or studying;

A genre vector, wherein the genre vector depends upon an expert listener's response to the questions regarding a music sample indicating if the music sample belongs to a plurality of genres including, Alternative, Blues, Country, Electronic/Dance, Folk, Gospel, Jazz, Latin, New Age, R&B, Soul, Rap, Hip-Hop, Reggae, Rock or others;

An ensemble vector, wherein the ensemble vector depends upon an experts listener's response to questions regarding a music sample indicating whether the music sample includes a female solo, male solo, female duet, male duet, mixed duet, female group, male group or instrumental; and An instrument vector, wherein the instrument vector depends upon an expert listener's response to questions regarding a music sample indicating whether the music sample includes an acoustic guitar, electric guitar, bass, drums, harmonica, organ, piano, synthesizer, horn, or saxophone.

One of the advantages of the present system is that feature vectors can describe music content. This assists in creating a music space for various attributes of music.

Another advantage of the present invention is that since the feature vectors define music attributes, music can be searched based upon music content.

User defined search parameters are sent to a MQL interface 401 that parses the search request and designs a search query. The search query is sent to a central database 402. One such database is described in U.S. patent application Ser. No. 09/533,045, entitled, "METHOD FOR CREATING A DATABASE FOR COMPARING MUSIC ATTRIBUTES", filed Mar. 22, 2000, assigned to the present assignee and incorporated herein in its entirety. Based upon the search query, a list of music samples is provided to the consumer.

Figure 4B:
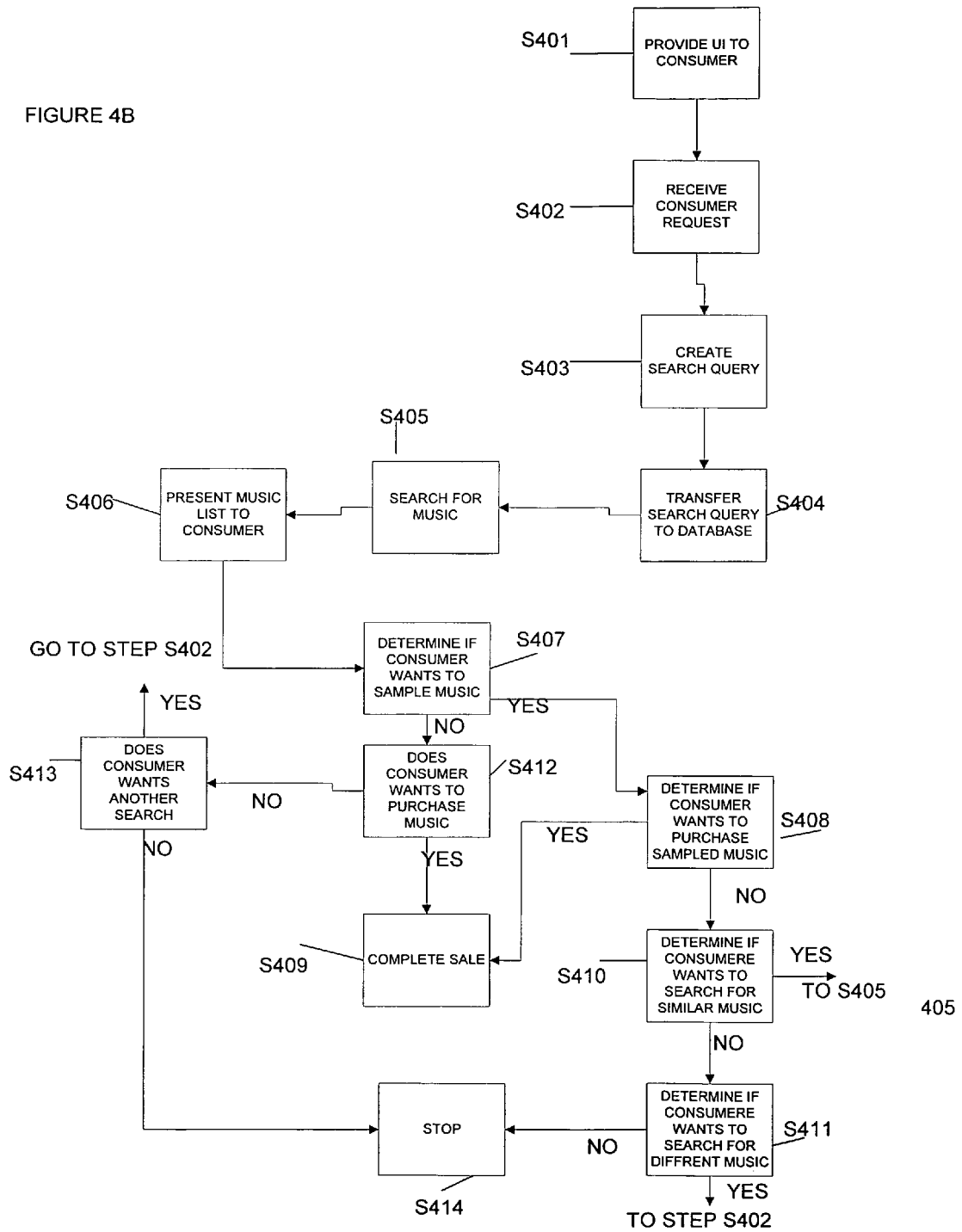
FIG. 4B is a flow diagram of process steps for efficiently presenting music to consumers, based upon consumer preferences and content based music searching techniques.

FIG. 4B is a flow diagram of process steps for providing music samples to a consumer who defines music search parameters.

In step S401, a consumer is provided with UI 400. The consumer may be provided with UI 400 on computing system 10. UI 400 may be provided to a consumer who shops at a brick and mortar retail store, for example at "Blockbuster®", or to a consumer shopping on line via the Internet while the consumer is visiting an on line retail store, for example, Amazon.com® (Registered Trademark) or CDNOW™ (Registered Trademark). A UI similar to UI 400 may be also provided to a consumer on a CD-ROM that also has audio samples.

In step S402, the consumer inputs search parameters. An example of one such consumer request may be to search for music that is a cross over between "Blues" and "Jazz", has a male vocalist, with a saxophone as a prominent instrument and the music is "Sad". The consumer inputs the search parameters in UI 400. An example of UI 400 is provided in FIGS. 4C1, 4C2 and 4C3. Besides inputting search parameters, the consumer may be asked to input consumer information to create a consumer profile. Such information may include, but is not limited to, consumer, name, address, phone number, electronic mail address, credit card number, other consumer preferences, choices, and tastes etc. Consumer profile information collected via UI 400 may be used to associate consumer likes and dislikes based upon the music purchased, the music sampled and/or music that is not purchased. Consumer defined search parameters may be stored and linked with a consumers's identity. For example, after a consumer's email and other information is acquired, the consumer may be given a unique identification number. Consumers may also be given the choice to pick a user identity. A consumer's email address may be used for identification.

In step S403, MQL interface 401 receives the consumer defined search parameters. Thereafter, MQL interface 401 formulates a search query based upon consumer defined search parameters.

In step S404, MQL interface 401 transfers the search query to database 402.

In step S405, the process searches for music based upon the consumer defined search parameters. The consumer search parameters define certain feature vectors that define music attributes. A similarity analysis is performed to find music similar to music with the feature vectors defined by the music search parameters. One method of performing such a similarity analysis is described in U.S. patent application Ser. No. 09/533,045, entitled, "METHOD FOR CREATING A DATABASE FOR COMPARING MUSIC ATTRIBUTES", filed on Mar. 22, 2000, assigned to the assignee herein and incorporated herein by reference in its entirety. Based upon the similarity analysis, database 402 provides a list of music samples to MQL interface 402.

In step S406, MQL interface 402 provides the list of music samples to the consumer. The list of music samples may be provided to the consumer via UI 400 if the consumer is at a retail store. If the consumer is shopping on line, the list of music samples may be provided via UI 400 or via email. Also, audio samples may be provided on a portable storage media, for example, a DVD, which can store audio samples and a browser that, may include UI 400.

In step S407, the process determines if a consumer wants to listen to any particular music from the sample list. If the consumer wants to listen to any particular sample, then in step S408, music samples are proved to the consumer and the consumer may be asked if the consumer wants to purchase the sampled music. If the consumer wants to purchase any particular music then the sale transaction is completed in step S409. If the consumer is in a retail store, the consumer may pay by cash, check or credit card. A consumer shopping on line may pay by credit or debit card or other similar means.

Any consumer purchases via UI 400 or the system under the present invention are tracked and stored in central database 402. The process flow for tracking such purchases are described below.

After the sale transaction is completed in step S409 or if the consumer does not purchase after step S408, in step S410, the consumer is asked if the consumer wants to listen to music similar to that provided in step S407. If the consumer wants to sample similar music, the process goes back to step S405.

If the consumer does not want to sample similar music, the consumer is asked in step S411, if the consumer wants different music. If the consumer wants different music, then the process moves back to step S402. If the consumer does not want different music, the process stops in step S414.

If the consumer does not want to sample music in step S407, then in step S412 the consumer is asked if the consumer wants to buy music without sampling. If the consumer wants to purchase music, the transaction is completed in step S409. If the consumer does not want to purchase music, the consumer is asked in step S413, if the consumer wants to conduct another search for more music. If the consumer wants to search for more music the process moves to step S402.

If the consumer does not want to start another search, then the process stops at step S414.

Figure 4D:
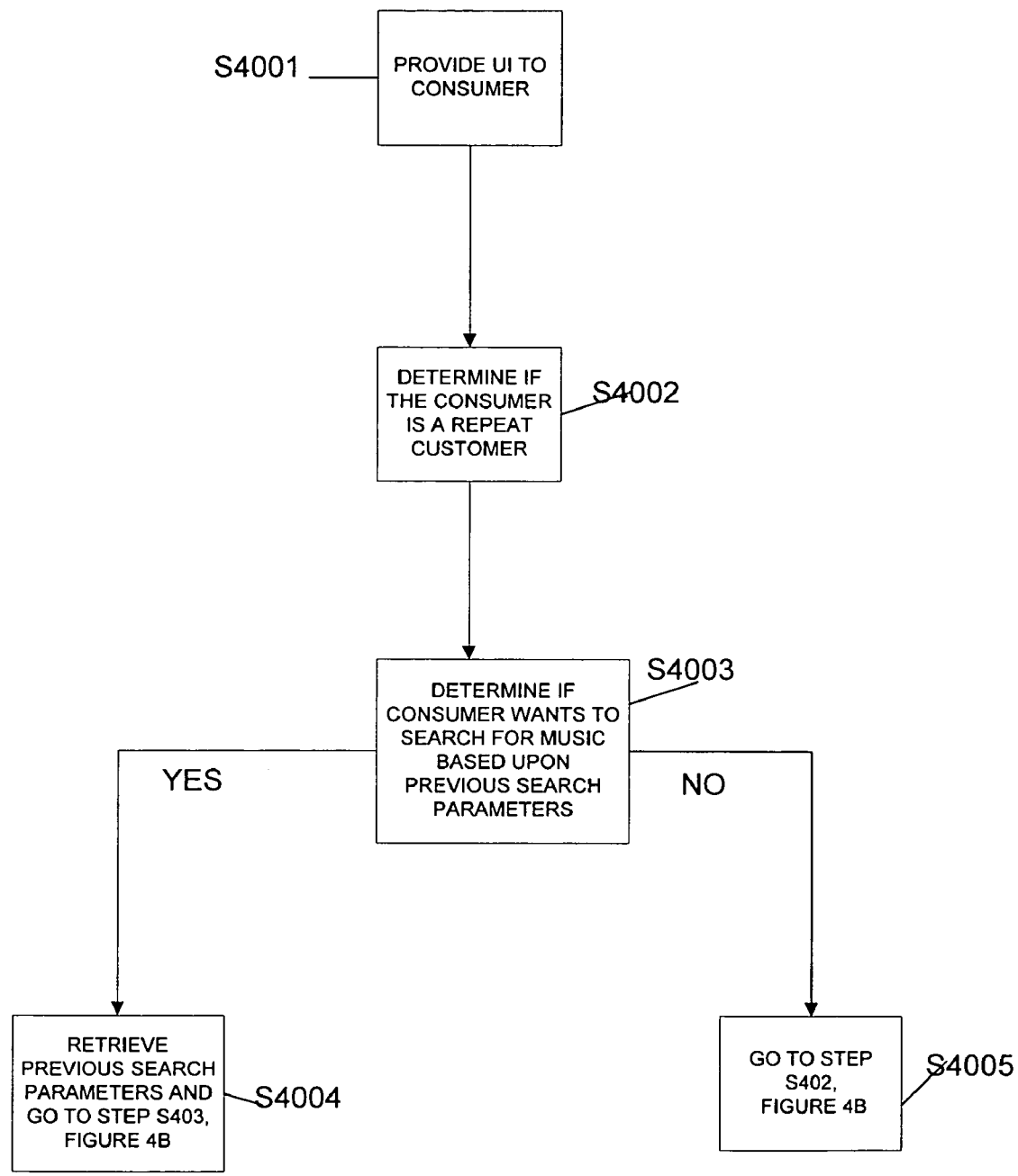

FIG. 4D is a process flow diagram for acquiring consumer input.

In step S4001, UI400 is provided to consumer. The consumer maybe provided UI400 on computing system 10.

In step S4002, determine if the consumer is a repeat customer. This may be determined by tracking the consumer identification number.

In step S4003, determine if the consumer wants to use a previous music search parameters.

In step S4004, if the consumer wants to use a previous search, the process proceeds to step S403 (FIG. 4B).

If the consumer wants a new search, then in step S4005, the process moves to step S402, FIG. 4B.

Figure 5A:
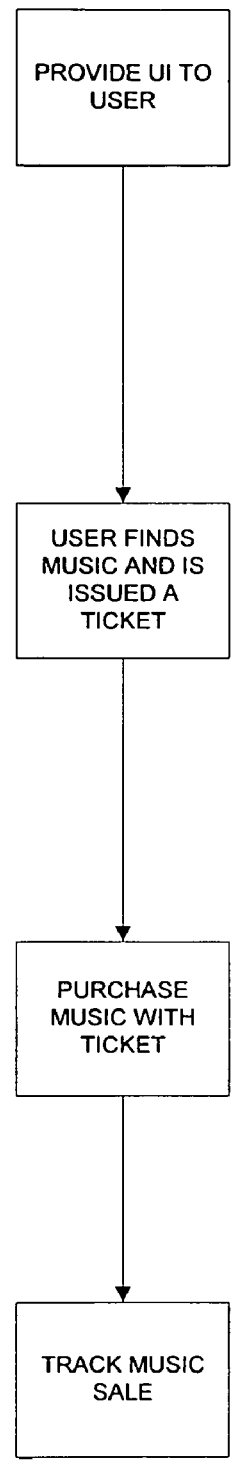
FIG. 5A is a flow diagram of process steps for tracking user purchases via a user interface.

FIG. 5A is a flow diagram of process steps for tracking user purchases through UI 400.

In step S500, UI 400 is provided to a user. Generally, such UI 400 is like a browser running on computer 10. Examples of UI 400 are provided in FIGS. 4C1, 4C2 and 4C3.

In step S501, user searches for particular music using UI 400 and decides to purchase some music. If the user is at a store then a purchase ticket (printed or electronic) is issued to the user. If the user is buying on line, a set of alphanumeric characters (transaction identification number) may be provided to the user.

In step S502, user purchases selected music with the ticket and/or transaction identification number.

In step S503, the sale through the tickets is categorized as a UI 400 sale. Such transaction records are then stored in a database, locally or remotely.

Figure 5B:
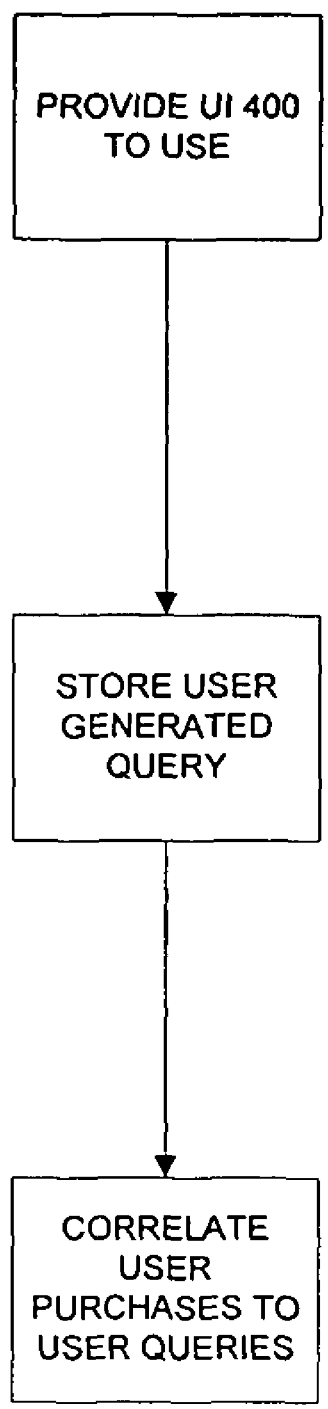
FIG. 5B is a flow diagram of process steps for tracking user purchases with user queries.

FIG. 5B is a flow diagram of process steps of tracking user purchases with user queries, while using UI 400.

In step S5000, a user is provided UI 400. Generally, such UI 400 is like a browser running on computer 10. Examples of UI 400 are provided in FIGS. 4C1, 4C2 and 4C3.

In step S5001, a user inputs search queries. Such user queries are stored in a database locally or remotely (central database 402).

In step S5002, if the user purchases any music on a particular query, then the purchase of that music is stored, and is attributed to UI 400. For example, if a user purchases a music title X within Y minutes of generating a query, then the sale of title X is categorized as a UI 400 sale.

One advantage of the present invention is that, a retail store, brick and mortar or on line can provide a tool to consumers for efficiently searching for music based upon music content.

Although the present invention has been described with reference to specific embodiments, these embodiments are illustrative only and not limiting. Many other applications and embodiments of the present invention will be apparent in light of this disclosure and the following claims.

What is claimed is:

1. A method for presenting user requested music via an interface, comprising:
   receiving a search query defining a plurality of music search parameters including one attribute corresponding to a genre and at least one attribute corresponding to an emotional quality of music content, wherein the emotional quality indicates whether the music content is at least one of intense, happy, sad, mellow, romantic, heartbreaking, aggressive, and upbeat;
   searching, by a processor, for one or more music samples based upon at least one similarity between the attribute corresponding to the genre and at least one feature vector assigned to the one or more music samples, and the at least one attribute corresponding to an emotional quality of music content and at least one feature vector assigned to the one or more music samples; and
   presenting via the interface the one or more music samples to the user based upon the searching.

2. The method of claim 1, further comprising:
   determining if the user wants to buy any of the music content associated with any of the presented music samples.

3. The method of claim 2, further comprising:
   determining if the user wants to sample another set of music samples having at least one attribute similar to the music the consumer wants to buy.

4. The method of claim 2, further comprising:
   determining if the user wants another set of music samples having at least one attribute different than the music the consumer wants to buy.

5. A method for presenting user requested music via an interface, comprising:
   receiving a search query defining a plurality of music search parameters including one attribute corresponding to a genre and at least one attribute corresponding to a situational quality of music content, wherein the situational quality indicates whether the music content is for at least one of a workout, a shopping mall, a dinner party, a dance party, a slow dance, and for studying;
   searching, by a processor, for music samples based upon at least one similarity between the attribute corresponding to the genre and at least one feature vector assigned to the one or more music samples, and the at least one attribute corresponding to the situational quality of music content and at least one feature vector assigned to the one or more music samples; and presenting via the interface one or more music samples to the user based upon the searching.

6. A method for presenting user requested music via an interface, comprising:
receiving a search query defining a plurality of music search parameters including one attribute corresponding to a genre and at least one attribute corresponding to a sound quality vector of the user requested music, wherein the sound quality vector indicates whether the music content has at least one of a strong beat, a simple beat, a groove-type rhythm, a speech like sound, and an emphasis on a melody;
searching, by a processor, for music samples based upon at least one similarity between the attribute corresponding to the genre and at least one feature vector assigned to the one or more music samples, and the at least one attribute corresponding to the sound quality vector of the user requested music and at least one feature vector assigned to the one or more music samples; and
presenting via the interface one or more music samples to the user based upon the searching.

7. A method for presenting user requested music via an interface, comprising:
receiving a search query defining a plurality of music search parameters including one attribute corresponding to a genre and at least one attribute corresponding to a vocal quality of music content, wherein the vocal quality indicates whether the music content includes at least one of a sexy voice, a smooth voice, a powerful voice, a great voice and a soulful voice;
searching, by a processor, for music samples based upon at least one similarity between the attribute corresponding to the genre and at least one feature vector assigned to the one or more music samples, and the at least one attribute corresponding to the vocal quality of music content and at least one feature vector assigned to the one or more music samples; and
presenting via the interface one or more music samples to the user based upon the searching.

8. The method of claim 5, further comprising:
determining if the user wants to buy any of the music content associated with any of the presented music samples.

9. The method of claim 8, further comprising:
determining if the user wants to sample another set of music samples having at least one attribute similar to the music the consumer wants to buy.

10. The method of claim 8, further comprising:
determining if the user wants another set of music samples having at least one attribute different than the music the consumer wants to buy.

11. The method of claim 6, further comprising:
determining if the user wants to buy any of the music content associated with any of the presented music samples.

12. The method of claim 11, further comprising:
determining if the user wants to sample another set of music samples having at least one attribute similar to the music the consumer wants to buy.

13. The method of claim 11, further comprising:
determining if the user wants another set of music samples having at least one attribute different than the music the consumer wants to buy.

14. The method of claim 7, further comprising:
determining if the user wants to buy any of the music content associated with any of the presented music samples.

15. The method of claim 14, further comprising:
determining if the user wants to sample another set of music samples having at least one attribute similar to the music the consumer wants to buy.

16. The method of claim 14, further comprising:
determining if the user wants another set of music samples having at least one attribute different than the music the consumer wants to buy.

17. A non-transitory computer-readable medium having stored thereon sequences of instructions, the sequences of instructions including instructions which when executed by a computer system causes the computer system to perform:
receiving a search query defining a plurality of music search parameters including one attribute corresponding to a genre and at least one attribute corresponding to an emotional quality of music content, wherein the emotional quality indicates whether the music content is at least one of intense, happy, sad, mellow, romantic, heartbreaking, aggressive, and upbeat;
searching, by a processor, for one or more music samples based upon at least one similarity between the attribute corresponding to the genre and at least one feature vector assigned to the one or more music samples, and the at least one attribute corresponding to an emotional quality of music content and at least one feature vector assigned to the one or more music samples; and
presenting via an interface the one or more music samples to the user based upon the searching.

18. The computer-readable medium of claim 17, further having stored thereon a sequence of instructions which when executed by the computer system causes the computer system to perform:
determining if the user wants to buy any of the music content associated with any of the presented music samples.

19. The computer-readable medium of claim 18, further having stored thereon a sequence of instructions which when executed by the computer system causes the computer system to perform:
determining if the user wants to sample another set of music samples having at least one attribute similar to the music the consumer wants to buy.

20. The computer-readable medium of claim 18, further having stored thereon a sequence of instructions which when executed by the computer system causes the computer system to perform:
determining if the user wants another set of music samples having at least one attribute different than the music the consumer wants to buy.

21. A non-transitory computer-readable medium having stored thereon sequences of instructions, the sequences of instructions including instructions which when executed by a computer system causes the computer system to perform:
receiving a search query defining a plurality of music search parameters including one attribute corresponding to a genre and at least one attribute corresponding to a situational quality of music content, wherein the situational quality indicates whether the music content is for at least one of a workout, a shopping mall, a dinner party, a dance party, a slow dance, and for studying;
searching, by a processor, for music samples based upon at least one similarity between the attribute corresponding to the genre and at least one feature vector assigned to the one or more music samples, and the at least one attribute corresponding to the situational quality of music content and at least one feature vector assigned to the one or more music samples; and presenting via an interface one or more music samples to the user based upon the searching.

22. The computer-readable medium of claim 21, further having stored thereon a sequence of instructions which when executed by the computer system causes the computer system to perform:
determining if the user wants to buy any of the music content associated with any of the presented music samples.

23. The computer-readable medium of claim 22, further having stored thereon a sequence of instructions which when executed by the computer system causes the computer system to perform:
determining if the user wants to sample another set of music samples having at least one attribute similar to the music the consumer wants to buy.

24. The computer-readable medium of claim 22, further having stored thereon a sequence of instructions which when executed by the computer system causes the computer system to perform:
determining if the user wants another set of music samples having at least one attribute different than the music the consumer wants to buy.

25. A non-transitory computer-readable medium having stored thereon sequences of instructions, the sequences of instructions including instructions which when executed by a computer system causes the computer system to perform:
receiving a search query defining a plurality of music search parameters including one attribute corresponding to a genre and at least one attribute corresponding to a sound quality vector of the user requested music, wherein the sound quality vector indicates whether the music content has at least one of a strong beat, a simple beat, a groove-type rhythm, a speech like sound, and an emphasis on a melody;
searching, by a processor, for music samples based upon at least one similarity between the attribute corresponding to the genre and at least one feature vector assigned to the one or more music samples, and the at least one attribute corresponding to the sound quality vector of the user requested music and at least one feature vector assigned to the one or more music samples; and
presenting via an interface one or more music samples to the user based upon the searching.

26. The computer-readable medium of claim 25, further having stored thereon a sequence of instructions which when executed by the computer system causes the computer system to perform:
determining if the user wants to buy any of the music content associated with any of the presented music samples.

27. The computer-readable medium of claim 26, further having stored thereon a sequence of instructions which when executed by the computer system causes the computer system to perform:
determining if the user wants to sample another set of music samples having at least one attribute similar to the music the consumer wants to buy.

28. The computer-readable medium of claim 26, further having stored thereon a sequence of instructions which when executed by the computer system causes the computer system to perform:
determining if the user wants another set of music samples having at least one attribute different than the music the consumer wants to buy.

29. A non-transitory computer-readable medium having stored thereon sequences of instructions, the sequences of instructions including instructions which when executed by a computer system causes the computer system to perform:
receiving a search query defining a plurality of music search parameters including one attribute corresponding to a genre and at least one attribute corresponding to a vocal quality of music content, wherein the vocal quality indicates whether the music content includes at least one of a sexy voice, a smooth voice, a powerful voice, a great voice and a soulful voice;
searching, by a processor, for music samples based upon at least one similarity between the attribute corresponding to the genre and at least one feature vector assigned to the one or more music samples, and the at least one attribute corresponding to the vocal quality of music content and at least one feature vector assigned to the one or more music samples; and
presenting via an interface one or more music samples to the user based upon the searching.

30. The computer-readable medium of claim 29, further having stored thereon a sequence of instructions which when executed by the computer system causes the computer system to perform:
determining if the user wants to buy any of the music content associated with any of the presented music samples.

31. The computer-readable medium of claim 30, further having stored thereon a sequence of instructions which when executed by the computer system causes the computer system to perform:
determining if the user wants to sample another set of music samples having at least one attribute similar to the music the consumer wants to buy.

32. The computer-readable medium of claim 30, further having stored thereon a sequence of instructions which when executed by the computer system causes the computer system to perform:
determining if the user wants another set of music samples having at least one attribute different than the music the consumer wants to buy.

* * * * *

UNITED STATES PATENT AND TRADEMARK OFFICE
CERTIFICATE OF CORRECTION

| | | |
|---|---|---|
| PATENT NO. | : 7,890,374 B1 | Page 1 of 2 |
| APPLICATION NO. | : 09/695526 | |
| DATED | : February 15, 2011 | |
| INVENTOR(S) | : Rehan M. Khan et al. | |

It is certified that error appears in the above-identified patent and that said Letters Patent is hereby corrected as shown below:

ON THE TITLE PAGE

<u>Item [56] OTHER PUBLICATIONS:</u>

Other Publications, --The DADPRO® Digital Audio Delivery System, Operation Manual, Version 1.0, Enco Systems, Inc. (1996)-- should be inserted.

<u>Item [57] ABSTRACT:</u>

Line 3, "of" should be deleted; and
Line 11, "than" should read --from--.

SHEET 5:

Figure 4B, S412, "WANTS" should read --WANT--;
Figure 4B, S413, "WANTS" should read --WANT--;
Figure 4B, S410, "CONSUMERE" should read --CONSUMER--;
Figure 4B, S411, "CONSUMERE" should read --CONSUMER--; and
Figure 4B, S411, "DIFFRENT" should read --DIFFERENT--.

COLUMN 2:

Line 22, "suffer" should read --suffers--; and
Line 43, "than" should read --from--.

COLUMN 3:

Line 3, "content based" should read --content-based--; and
Line 48, "an" should read --and--.

Signed and Sealed this
Twenty-eighth Day of February, 2012

David J. Kappos
*Director of the United States Patent and Trademark Office*

CERTIFICATE OF CORRECTION (continued)
U.S. Pat. No. 7,890,374 B1

COLUMN 7:

Line 11, "instruments," should read --instrument,--.

COLUMN 8:

Line 23, "cross over" should read --crossover--.

COLUMN 9:

Line 2, "that," should read --that--;
Line 15, "are" should read --is--; and
Line 44, "a" should be deleted.

COLUMN 10:

Line 50, "than" should read --from--.

COLUMN 11:

Line 50, "than" should read --from--; and
Line 62, "than" should read --from--.

COLUMN 12:

Line 7, "than" should read --from--;
Line 12, "causes" should read --cause--;
Line 48, "than" should read --from--; and
Line 53, "causes" should read --cause--.

COLUMN 13:

Line 22, "than" should read --from--; and
Line 27, "causes" should read --cause--.

COLUMN 14:

Line 9, "than" should read --from--;
Line 14, "causes" should read --cause--; and
Line 51, "than" should read --from--.